United States Patent [19]

Vowles

[11] Patent Number: 5,278,633
[45] Date of Patent: Jan. 11, 1994

[54] OPTICAL CONTOUR DETECTOR AND METHODS FOR MAKING AND USING

[75] Inventor: Dave L. Vowles, Phoenix, Ariz.

[73] Assignee: Motorola, Inc., Schaumburg, Ill.

[21] Appl. No.: 925,132

[22] Filed: Aug. 6, 1992

[51] Int. Cl.⁵ .......................... G01B 11/24; G01P 3/36
[52] U.S. Cl. ..................... 356/376; 250/561; 356/1; 356/28
[58] Field of Search .............. 356/1, 27, 28, 373, 356/375, 376, 372; 250/561, 221, 222.1, 224, 231.13, 231.14, 231.16

[56] References Cited

U.S. PATENT DOCUMENTS

| | | | |
|---|---|---|---|
| 3,636,364 | 1/1972 | Stempler et al. | 250/231.16 |
| 3,671,126 | 6/1972 | Erb | 356/1 |
| 4,092,068 | 5/1978 | Lucas et al. | 356/73 |
| 4,567,347 | 1/1986 | Ito et al. | 356/1 |
| 4,634,879 | 1/1987 | Penney | 250/560 |
| 4,850,712 | 7/1989 | Abshire | 356/376 |

*Primary Examiner*—F. L. Evans
*Attorney, Agent, or Firm*—Joe E. Barbee

[57] ABSTRACT

An optical contour detector (11) having a source of electromagnetic radiation (12) aimed at a contoured surface is provided. A first detector (13) and a second detector (14) are positioned near the contoured surface for detecting electromagnetic radiation reflected from a first portion of the surface. Outputs of the first detector (13) and the second detector (14) are differentially amplified to produce an output signal indicting when a change in contour or discontinuity in the surface is illuminated by the source of electromagnetic radiation (12).

15 Claims, 1 Drawing Sheet

OPTICAL CONTOUR DETECTOR AND METHODS FOR MAKING AND USING

BACKGROUND OF THE INVENTION

The present invention relates, in general, to solid state sensors, and more particularly, to solid state sensors for detecting contours in a traveling surface using reflected electromagnetic radiation.

Optical sensors, including combinations of light emitting diodes (LEDs) and photodiode detectors are used to monitor motion of moving objects. Currently available systems use a single LED aimed at a portion of a surface of an object being monitored, and usually use a single detector to detect a change in reflected light from the surface. The detector diode is positioned in the reflection path of the light reflected from the surface of the object being monitored. An example of such a system is shown in U.S. Pat. No. 4,850,712 issued to James B. Abshire on Jul. 25, 1989.

Since the single detector only responds to a change in reflectivity of the surface, the surface must be treated or marked to provide a clear change in reflectivity. For example, rotation of a wheel can be optically monitored by placing one or more "dark" or low reflectivity marks on a normally reflective surface of the wheel. As the wheel turns, the quantity of light reflected from the surface varies. This variation is then detected by the single photodiode in the reflection path.

One problem with current surface monitors is that it is that the reflectivity of common machine parts varies significantly as a result of surface roughness, cleanliness, and wear over time. Moreover, surface texture and finish must be carefully controlled for the surface monitor to work. This natural variation in reflectivity decreases the signal to noise ratio of the surface monitor, making it difficult to reliably detect the low reflectivity marks placed on the surface to be monitored.

What is needed is a surface monitor that is less sensitive to surface finish and texture, and can detect small changes in surface contour.

SUMMARY OF THE INVENTION

Briefly stated, the present invention is achieved by an optical contour detector including a source of electromagnetic radiation aimed at a contoured surface and first and second detectors positioned near the contoured surface for detecting electromagnetic radiation reflected from a first portion of the surface.

In a method for making an optical contour detector in accordance with the present invention, a source of electromagnetic radiation is positioned at a first predetermined angle sufficient to allow reflection of some of the electromagnetic radiation from a portion of the surface being monitored. First and second detectors for detecting the reflected electromagnetic radiation are positioned adjacent to each other and at a second predetermined angle sufficient to allow substantially equal portions of the reflected light to fall on the first and second detectors.

In a method for using an optical contour detector in accordance with the present invention a moving surface having contours at predetermined locations is monitored. A portion of the surface is illuminated with a source of electromagnetic radiation having a wavelength and angle of the radiation chosen to at least partially reflect from the moving surface. First and second signals are generated that are a function of a quantity of radiation reflected from a first portion of the surface. The first and second signals are differentially amplified to generate a difference signal when a surface contour is illuminated by the source of electromagnetic radiation.

DETAILED DESCRIPTION OF THE DRAWINGS

Figure 1:
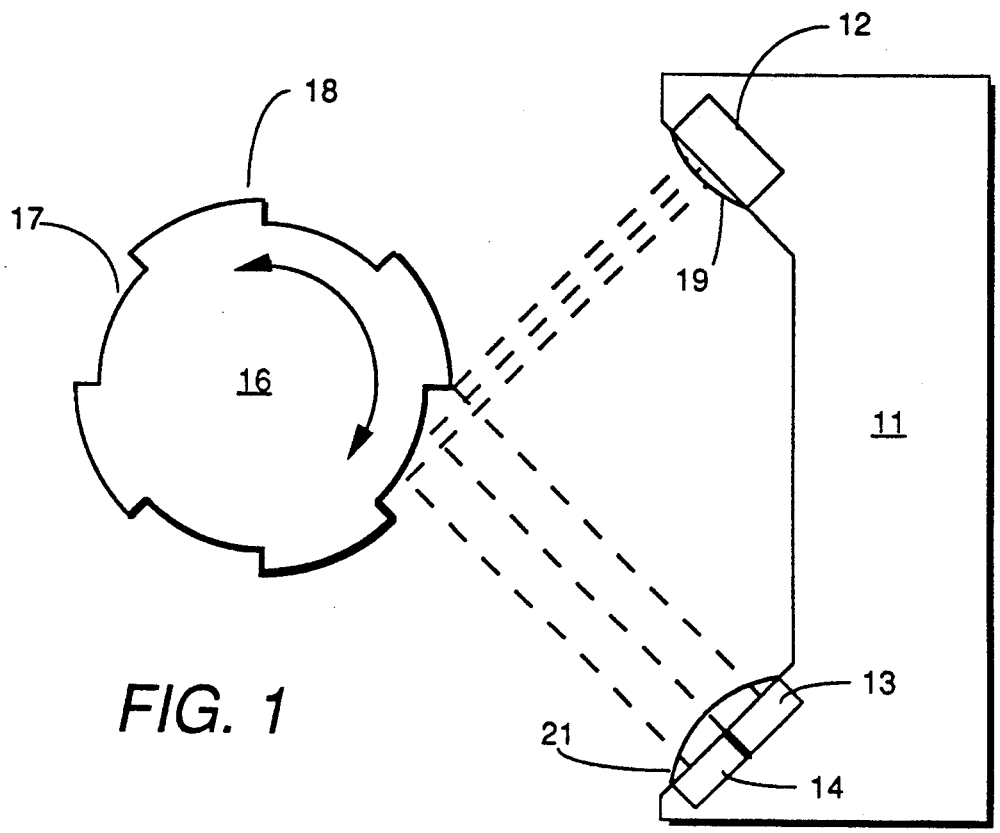
FIG. 1 is a highly simplified cross-section view of a portion of a system using an optical contour detector in accordance with the present invention.

FIG. 1 illustrates a highly simplified cross-section view of a portion of a system using an optical contour detector in accordance with the present invention. The system shown in FIG. 1 is useful in particular for monitoring the speed of wheel 16, but it will be apparent that any number of surfaces having a variety of shapes can be monitored using the optical contour detector in accordance with the present invention. In the embodiment shown in FIG. 1, wheel 16 includes a number of low regions 17 and high regions 18 positioned at predetermined locations. Thus, the circumference of wheel 16 provides a contoured surface having a number of edges where low regions 17 meet high regions 18.

An optical contour detector is shown housed in a single housing 11, although discrete components may be used. A source of electromagnetic radiation 12 is positioned at an angle to emit energy in the direction of the surface of wheel 16. The wavelength of radiation produced by source 12 is chosen to at least partially reflect from the surface of wheel 16. In a preferred embodiment source 12 comprises a light emitting diode (LED) emitting energy in the infrared portion of the electromagnetic spectrum. As shown by the dashed lines in FIG. 1, a transmission path exists between source 12 and the surface being monitored of wheel 16.

The emitted energy can pass through optional lens 19 which is used to aim, focus, or collimate the electromagnetic energy. When used, lens 19 is located in the transmission path between source 12 and wheel 16. In applications where source 12 can be located close enough to the surface to be monitored, lens 19 is usually not required.

The emitted energy illuminates a portion of the surface of wheel 16, and reflects towards detectors 13 and 14. As shown by the dashed lines in FIG. 1, a reflection path exists between the surface being monitored of wheel 16 and detectors 13 and 14. Detectors 13 and 14 are chosen to be sensitive to the wavelength of radiation emitted from source 12, and are positioned adjacent to each other. In the preferred embodiment, detectors 13 and 14 are positioned at an angle to maximize the quantity of reflected light that reaches them, and are located so that substantially the same quantity of light falls on each detector except when a contour discontinuity is illuminated by source 12. While detectors 13 and 14 can be provided by discrete components such as photodiodes, in the preferred embodiment they comprise two photodiodes formed on a single monolithic semiconductor substrate to ensure matched performance.

The reflected energy can pass through optional lens 21 which is used to aim, focus, or collimate the reflected electromagnetic energy. Lens 21 is positioned in the reflection path between wheel 16 and detectors 13 and 14. In applications where detectors 13 and 14 can be located close enough to the surface to be monitored, lens 21 is usually not required.

In operation, detectors 13 and 14 are constantly bathed in electromagnetic energy reflected from the surface of wheel 16. As wheel 16 turns, high regions 18 and low regions 17 are alternately illuminated by source 12. While only high regions 18 are illuminated, both detector 13 and detector 14 receive approximately equal quantities of energy, and produce a closely matched output. Similarly, when only low regions 17 are illuminated, both detector 13 and detector 14 receive approximately equal quantities of energy, and produce a closely matched output.

However, whenever a contour, such as the step between low regions 17 and high regions 18 is illuminated, one of detectors 13 or 14 will momentarily receive a greater quantity of light than the other. As wheel 16 continues to rotate, this imbalance in reflected energy travels across the surface of detectors 13 and 14 creating an equal and opposite response at a moment later in time.

Figure 2:
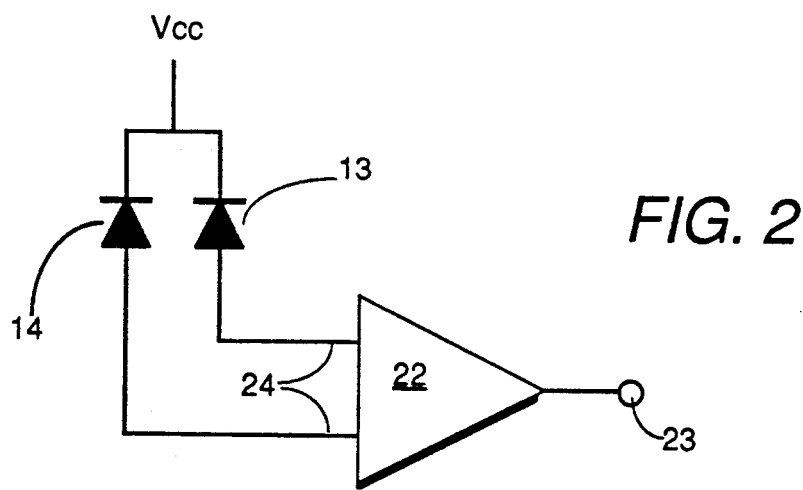
FIG. 2 is a schematic drawing illustrating a method of using the contour detector shown in FIG. 1.

As shown in FIG. 2, each of detectors 13 and 14 create an output. In a preferred embodiment, detector 13 is coupled to one input 24 of a differential amplifier 22, while detector 14 is coupled to another input 24 of differential amplifier 22. Differential amplifier 22 may comprise any of a number of well known circuits that differentially amplify or compare two input signals and produce an output 23 that is a function of the difference between the two inputs. Differential amplifier 22 is optionally formed on the same monolithic semiconductor substrate as detectors 13 and 14.

As long as detectors 13 and 14 receive substantially the same quantity of reflected energy, their outputs will be substantially equal and output 23 produces a constant signal. As described above, when a contour discontinuity in the surface of wheel 16 (shown in FIG. 1) is illuminated by source 12 (shown in FIG. 1) a brief pulse is produced at output 23 because of the imbalance in light received by detectors 13 and 14. A moment later, as wheel 16 rotates, a second pulse of opposite polarity from the first pulse is generated at output 23.

Although a number of useful functions are possible for the optical contour monitor in accordance with the present invention, in the preferred embodiment the speed of wheel 16 is monitored. Given the two pulse signal from output 23, speed can be calculated by counting pulses, or by measuring the time delay from the first pulse to the second pulse. Another useful function includes monitoring the amplitude of the pulses at output 23 to determine wear on a machine part such as a gear or saw blade. Because two detectors are differentially amplified, the magnitude of the output is more reliable an indicator of the surface contour that is possible with a single detector.

By now it should be appreciated that an optical contour detector and method for making and using it are provided. The structure in accordance with the present invention provides two detector outputs that are differentially amplified to produce an output that is sensitive to contours in the surface being monitored. Because the system in accordance with the present invention actually detects a change in contour as opposed to a change in reflectivity, the signal generated is much more immune to variations caused by surface reflectivity, texture, and finish as well as ambient lighting conditions. Moreover, differential amplification of two matched detectors produces a high signal to noise ratio output that is sensitive to small contour changes in a surface being monitored.

I claim:

1. An optical contour detector comprising: a source of electromagnetic radiation aimed at a contoured surface, wherein the contoured surface moves with respect to the source of electromagnetic radiation and the surface is at least partially reflective of the electromagnetic radiation; a first detector positioned near the contoured surface for detecting electromagnetic radiation reflected from a first portion of the surface; a second detector positioned near the surface and adjacent to the first detector for detecting electromagnetic radiation reflected from a second portion of the surface.

2. The optical contour detector of claim 1 further comprising a lens positioned in a transmission path between the source and the contoured surface.

3. The optical contour detector of claim 1 further comprising a lens positioned in a reflection path between the contoured surface and the first and second detectors.

4. The optical contour detector of claim 1 wherein the source of electromagnetic radiation comprises a light emitting diode and the electromagnetic radiation is infrared.

5. The optical contour detector of claim 1 further comprising a differential amplifier having a first input, a second input, and an output that produces a signal proportional to the difference between the first input and the second input, wherein the first detector is coupled to the first input and the second detector is coupled to the second input.

6. The optical contour detector of claim 1 wherein the first and second detectors comprise photodiodes.

7. The optical contour detector of claim 6 wherein the first and second detectors are formed on a single monolithic semiconductor device.

8. The optical contour detector of claim 5 wherein the first and second detectors and the differential amplifier are formed on a single monolithic semiconductor device.

9. A method for using an optical contour detector for measuring speed of a moving surface comprising the steps of: providing a moving surface having contours at predetermined locations; illuminating a region of the surface with a source of electromagnetic radiation, wherein the wavelength and angle of the radiation is chosen to at least partially reflect from the moving surface; generating a first signal that is a function of a quantity of radiation reflected from a first portion of the surface; generating a second signal that is a function of a quantity of light reflected from a second portion of the surface; differentially amplifying the first and second signals to generate a difference signal when a surface contour discontinuity is illuminated by the source of electromagnetic radiation; and monitoring the difference signal to determine the speed of the moving surface.

10. The method of claim 9 further comprising the step of collimating the electromagnetic radiation before the step of illuminating the surface.

11. The method of claim 9 wherein the wavelength is in the infrared portion of the electromagnetic spectrum.

12. The method of claim 9 wherein the first and second signals are substantially equal when the illuminated portion of the surface does not contain a contour discontinuity.

13. A method for making an optical contour detector comprising the steps of: providing a source of electromagnetic radiation; positioning the source of electromagnetic radiation at a first predetermined angle, wherein the first predetermined angle is sufficient to allow reflection of some of the electromagnetic radiation from a surface being monitored, and moving the surface being monitored with respect to the source of electromagnetic radiation; providing a first detector for detecting the reflected electromagnetic radiation; providing a second detector for detecting the reflected electromagnetic radiation; and positioning the first and second detectors adjacent to each other and at a second predetermined angle, wherein the second predetermined angle is sufficient to allow substantially equal portion of the reflected light to fall on the first and second detectors.

14. The method of claim 13 further comprising the steps of: providing a differential amplifier having a first input, a second input, and an output that produces a signal proportional to the difference between the first input and the second input; coupling the first detector to the first input; and coupling the second detector to the second input.

15. A device for detecting speed of a contoured rotating surface, comprising:

a source of electromagnetic radiation aimed at a contoured rotating surface, wherein the contoured rotating surface has contours at predetermined locations, and the contoured rotating surface is at least partially reflective of the electromagnetic radiation;

a first detector positioned near the contoured rotating surface for detecting electromagnetic radiation reflected from a first portion of the contoured rotating surface;

a second detector positioned near the contoured rotating surface and adjacent to the first detector for detecting electromagnetic radiation reflected from a second portion of the contoured rotating surface; and a differential amplifier having a first input, a second input, and an output for producing a signal proportional to the difference between the first input and the second input, wherein the first detector is coupled to the first input and the second detector is coupled to the second input, and the differential amplifier produces an output signal whenever a surface contour discontinuity is illuminated by the source of electromagnetic radiation, wherein the output signal may be monitored to determine speed of the contoured rotating surface.

* * * * *